Figure 1:
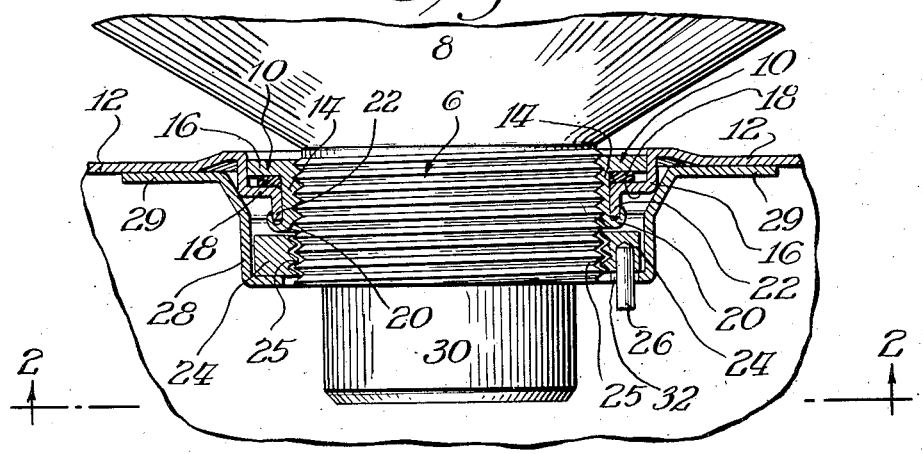

March 6, 1934.  A. L. WERTZ  1,950,368

SELF LOCKING DEVICE

Filed Feb. 19, 1932

Inventor
Austin L. Wertz.
By Williams, Bradbury,
McCaleb & Hinkle, Attys.

Patented Mar. 6, 1934

1,950,368

UNITED STATES PATENT OFFICE 1,950,368

SELF-LOCKING DEVICE

Austin L. Wertz, Lakewood, Ohio

Application February 19, 1932, Serial No. 593,952

20 Claims. (Cl. 285—50)

This invention relates to self-locking devices and particularly to a means for preventing the unauthorized uncoupling of screw threaded members, such as pipe couplings and the like. My invention is subject to variety of applications, but is particularly suitable for application to metal drums or tanks adapted for use with removable pumps for the dispensation of lubricating oils, and similar products.

An important object of my invention is the provision of a self-locking device applicable to the pump mounting member in a supply drum and which will permit attaching a pump to the drum, but prevent its unauthorized removal therefrom.

It is also an object to provide locking means in screw threaded couplings having exteriorly and interiorly threaded coupling members, whereby the exteriorly threaded member or nipple may be readily screwed into the other member, but cannot be unauthorizedly removed therefrom.

Another object is the provision of a self-acting locking nut in the threaded mounting member of dispensing drums and the like to prevent unauthorized refilling or re-use of such drums.

It is a further object of this invention to provide for screw threaded coupling members a self-acting locking member similar to a lock-nut and having a trigger release to prevent the action of the locking member in its locking function.

Figure 2:
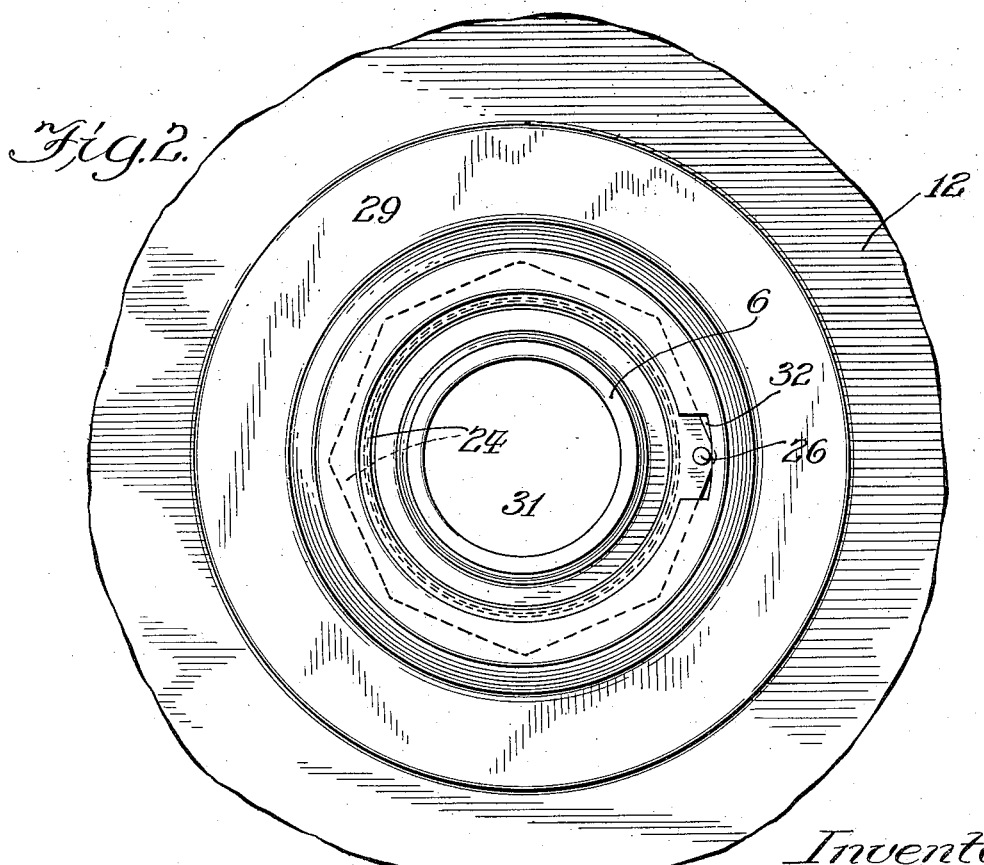

Other objects and advantages residing in my invention will appear from the following description taken with the drawing, in which:

Fig. 1 is a fragmentary elevation in section of a dispensing pump nipple screwed into the threaded receiving member in a drum head; and Fig. 2 is a bottom plan view of the lock nut housing.

In the dispensation of lubricating oils and the like it is customary to supply the product in large drums which are usually attractively colored and especially identified with the trade name or mark of the drum's contents. These drums are supplied with screw threaded, flanged openings adapted to receive the mounting nipple of a dispensing pump, so that pumps may be readily transferred from one drum to another as the latter are emptied of their contents.

In order to prevent the fraudulent refilling of such drums with inferior and cheaper products when they have once been emptied of their original contents, and as a measure of protection to both the manufacturer of reputable and well-known products as well as the buying public, it is necessary to provide means for permitting a pump to be applied to a drum by any one, while at the same time preventing the possibility of the pump's being removed therefrom for refilling except by someone authorized to do so.

My invention described herein provides a simple and effective means to this end. It is inexpensive to manufacture, simple in construction and positive in its action, and it can be applied easily to standard types of drums.

In Fig. 1, I show in section the threaded mounting nipple 6 extending from the lowermost position of a pump 8 and threaded into the receiving coupling or member 10 in a drum head 12. The threaded portion of the receiving member comprises an interiorly threaded ring 14, having a flanged portion 16 at its upper extremity, which rests upon the inset part of the drum opening 18, the lowermost face 20 of the ring being peened or rolled back over the lip 22 of the inset portion of the drum-head opening firmly to secure the receiving member in its seat.

My novel locking means comprises a lock nut or collar 24 which is provided with a suitably tapered threading 25 and a depending trigger pin 26 which is preferably extended downwardly from the plane of the lowermost face of the nut and is firmly secured in the nut stock. The nut 26 is held in alinement with the threaded flange or mounting member 10 by means of the housing 28 which comprises a steel or similar stamping having a wide flanged portion 29 at its top, and a wide opening or bore 31 in its lowermost portion to permit the passage therethrough of the pump feed pipe 30. A slot 32 (Fig. 2) is cut in the periphery of the opening 31 in the housing 28 through which the trigger pin 26 extends from the nut housing. The locking nut 24 is free to rotate in the housing within the limits provided by the movement of the pin 26 in the slot 32.

It is necessary that the clearance between the upper face of the locking nut 24 and the lowermost edge of the lip 22 be accurately gauged with respect to the distance of travel in the slot 32 of the pin 26, in order to permit the nut to travel a sufficient distance with the nipple upon the threading out motion to engage the lip or rim 22.

In applying the pump 8 to the drum 12, the threaded nipple 6 is screwed into the opening 10 in the usual manner, the nipple threading engaging the threads of the interiorly threaded ring 14 and also the threading 25 of the nut 24. When an attempt is made to thread the pump nipple out of the drum, however, the nut 24 due to the taper of its threading, will ride with the nipple until its upper face engages the lip or rim 22 of the interiorly threaded portion of the receiving coupling 14, whereupon the nut 24 operates as a lock nut and prevents further unscrewing of the pump nipple.

The pump may be removed, however, by engaging the trigger pin 26 and holding it at one extremity of its limit of travel in the slot 32 in a direction opposite to the movement of the nut 24 in the threading-out operation in such a manner that the lock nut is prevented from engaging and jamming with the lip 22. Suitable means are provided in drums equipped with this locking device for rendering the trigger 26 accessible to persons authorized to remove the pump.

Numerous modifications of the trigger pin arrangement and lock nut housing may be made without departing from the scope of the invention. Likewise while the lock nut housing 29 may be welded to the inner face of the drum head adjacent the pump opening, my invention contemplates and includes those mounting methods which would render my self-locking device applicable to any standard drum or any device utilizing similar coupling means, and I do not wish to be restricted to the specific details of the disclosure herein set forth except to the extent by which I may limit my invention in the following claims, which I desire to protect by Letters Patent of the United States.

1. A self-locking pipe coupling for supply drums and the like, comprising a screw-threaded receiving member having a flanged portion, a lock-nut in alignment with said receiving member and adapted to lock against said flanged portion by the threading out motion of a coupling member screwed into said receiving member, and supporting means for said lock nut limiting both its axial and rotational movements.

2. In dispensing drums and the like having a screw-threaded aperture to receive a dispensing device provided with a threaded coupling nipple, self-locking means to prevent the withdrawal of said dispensing device once it has been screwed into said aperture, said means comprising a lock-nut having a tapered thread in alignment with said aperture and adapted to be forced against an extremity thereof by the threading-out motion of said nipple whereby a further unscrewing of said nipple is prevented, and means supporting said lock nut in operative position and limiting both its axial and rotary movements.

3. In supply tanks and the like having screw-threaded coupling means to receive a dispensing device having a correspondingly threaded mounting nipple, self-locking means to permit screwing said nipple into said coupling means and prevent unscrewing said nipple therefrom, said means comprising a locking member having a tapered thread in alignment with said coupling means to thread on to said nipple when it is screwed into said means, and to be carried by said nipple with the screwing-out motion thereof against an extremity of said coupling means whereby to lock said nipple in said coupling means, said locking member being provided with means operable to prevent its being carried into locking position to permit an authorized removal of said device, and means supporting said locking member in alignment with said coupling means adapted to limit both rotary and axial movements thereof.

4. Self-locking means for screw-threaded pipe coupling members comprising a lock-nut having a tapered thread and co-operating with said coupling members to permit their being threaded together and to prevent their being threaded apart, said nut being adapted to jam against one of said members by the threading-out movement of the other said member and said nut being further provided with releasing means to prevent such jamming, said nut being supported with respect to one of said members to form a unitary locking assembly.

5. Locking means for attachments having screw-threaded mounting means including interiorly and exteriorly threaded coupling members, said locking means comprising a collar having a tapered interior thread cooperable with a said interiorly threaded member to receive a said exteriorly threaded member and form a thread locking engagement therewith when said exteriorly threaded member is removed therefrom, said collar being supported adjacent to said interiorly threaded member for limited movement with respect thereto.

6. The combination with a tank or the like having a screw-threaded attachment receiving member, of means for preventing the unauthorized removal of an attachment from said member, said means comprising a lock-nut positioned with respect to said receiving member for limited movement to thread over the attachment mounting by the screwing-in operation of the latter, the screwing-out operation thereof locking said nut against said receiving member, said nut having means engageable to prevent its being carried against and locking with said receiving member.

7. In combination, a principal threaded receiving member, a similarly threaded engaging member threadable into and out of said receiving member, a second threaded receiving member having a tapered thread and cooperable with said first mentioned receiving member to permit said engaging member to be threaded into said principal receiving member and prevent the subsequent threading out of said engaging member by setting up a restraining force, in the manner of a lock-nut, and means securing said receiving members together and permitting limited rotary and axial movements of the second receiving member.

8. In combination, a principal threaded receiving member, a similarly threaded engaging member threadable into and out of said receiving member, a second threaded receiving member, means for holding said second member in operative relationship with said principal member to receive said engaging member in cooperation with said principal member, said second member having a tapered thread and being adapted to be carried against said principal member by said engaging member by a disengaging movement thereof to lock said several members one with the other and prevent the complete disengagement of said engaging member, and means in said second member engageable to prevent said locking.

9. In combination with a supply drum having a threaded receiving member and a dispensing device having a similarly threaded coupling nipple threadable into and out of said receiving member, means for locking said device in said drum, said means comprising a lock-nut, holding means affixed to said drum for maintaining said nut in operative relationship with said receiving member to engage said nipple when it is threaded into said receiving member, said holding means being provided with a stop, said nut having a depending trigger cooperable with said stop to limit the movement of said nut in said holding means, and manually engageable to prevent locking movement of said nut, said nut being further arranged in spaced relationship with said receiving member to be forced against the latter by the uncoupling movement of said nipple to lock the latter in said nipple.

10. In dispensing devices and the like, coupling and locking means to prevent the removal of dispensing attachments having a screw-threading coupling member, said means comprising a principal threaded receiving coupling affixed to the drum, and a second threaded receiving member in register with said principal coupling and moveable with respect thereto to receive an exteriorly threaded attachment coupling, said second member being moveable under the threading-out motion of an attachment coupling to jam and lock with said principal member and prevent complete withdrawal of the attachment coupling, said second member being provided with means engageable to control its locking movement.

11. A locking assembly for pipe couplings and the like comprising a fixed threaded receiving member, a second threaded receiving member, means supporting said second receiving member in alignment therewith and permitting a limited axial movement with respect to said first mentioned member, and means providing a limited relative rotational movement between said members.

12. Locking means for threaded coupling members comprising a principal fixed threaded receiving member and a movable threaded receiving member supported for limited movement with respect to said fixed member and adapted to cooperate with said fixed member to receive a threaded coupling nipple and jam with said fixed member after the manner of a lock nut when said nipple is threaded out, said movable member being provided with a portion readily engageable to prevent such jamming and permit the ready withdrawal of a said nipple.

13. Locking means for threaded coupling members comprising a threaded receiving member and a locking nut having a threaded portion held in register with the threaded portion of said receiving member and adapted for limited movement with respect thereto, whereby a coupling member may be readily threaded into said receiving member and said locking nut but the withdrawal of said coupling member will cause said locking nut to firmly jam said several members and prevent further uncoupling.

14. A locking mechanism for threaded couplings comprising a fixed threaded receiving member and a movable threaded receiving member, and means for supporting said movable member for limited movement with respect to said fixed member, said movable member having a tapered thread and a portion engageable to prevent its movement into locking engagement with said fixed member.

15. A locking mechanism for threaded couplings of the type having a receiving member and an engaging member, which comprises a stationary threaded receiving member, a movable threaded receiving member, means for supporting said movable member for limited movement in alignment with said stationary member, means for maintaining said movable member in position to permit the ready threading in of an engaging member and to cause said movable member to be forced into locking engagement with said fixed member by the threading out movement of said engaging member, and means engageable to prevent the locking of said movable member with said fixed member.

16. In combination a stationary threaded receiving member, a movable threaded receiving member, means for supporting said movable member in movable alignment with said stationary member, said movable member being constructed to form a locking combination with said fixed member when threadedly moved in one direction and to form a non-locking combination when moved in the other direction, said movable member having means engageable to prevent its locking movement.

17. In combination a stationary threaded receiving member, a movable threaded receiving member, means for supporting said movable member in movable alignment with said stationary member, said movable member being constructed to form a locking combination with said fixed member when threadedly moved in one direction and to form a non-locking combination when moved in the other direction.

18. A locking device for threaded couplings having a threaded receiving portion, comprising a movable threaded member, an apertured housing supporting said movable member in register with said receiving portion, said housing having a slot adjacent said aperture, and said movable member having a pin depending into said slot.

19. A self-locking coupling comprising fixed and movable threaded portions, means supporting said movable portion in operative alignment with said fixed portion, said movable portion having a part cooperable with said supporting means and effecting locking and non-locking engagement between said portions upon the threading out and threading in respectively of a coupled member.

20. In combination, an engaging member, a lock nut, means for supporting said nut for limited movement with respect to said engaging member, and means causing said nut to assume a non-locking position when the combination is threaded one direction, and to assume a locking position when the said combination is threaded the other direction.

AUSTIN L. WERTZ.